Oct. 27, 1953     W. S. PRAEG     2,656,655
GRINDER

Filed April 23, 1951     5 Sheets-Sheet 1

INVENTOR.
WALTER S. PRAEG
BY *Whittemore,*
*Hulbert & Belknap*
ATTORNEYS

Oct. 27, 1953

W. S. PRAEG 2,656,655

GRINDER

Filed April 23, 1951

INVENTOR.
WALTER S. PRAEG
BY Whittemore,
Hulbert & Belknap
ATTORNEYS

Oct. 27, 1953  W. S. PRAEG  2,656,655
GRINDER

Filed April 23, 1951   5 Sheets-Sheet 5

*INVENTOR.*
WALTER S. PRAEG
BY *Whittemore,*
*Hulbert & Belknap*
ATTORNEYS

Patented Oct. 27, 1953

2,656,655

UNITED STATES PATENT OFFICE 2,656,655

GRINDER

Walter S. Praeg, Detroit, Mich., assignor to National Broach & Machine Company, Detroit, Mich., a corporation of Michigan Application April 23, 1951, Serial No. 222,304

17 Claims. (Cl. 51—216)

1

The present invention relates to a grinder and more particularly to a grinder provided with means effective to automatically index the grinder upon completion of each reciprocation of the grinding stroke.

It is an object of the present invention to provide means automatically operable adjacent the end of the driving stroke to provide relative rotation between the work piece and the lead bar to carry out indexing.

It is a further object of the present invention to provide automatic indexing which employs the last few inches of travel of the grinding stroke to provide the indexing motion.

More specifically, it is an object of the present invention to provide a grinder having a lead bar, work engaging means, index mechanism coupling the lead bar to the work engaging means, means operable by the working stroke of the machine to release the index mechanism, means effective to arrest rotation of the work engaging means and to effect relative rotation between the parts of the index mechanism, and means for re-engaging cooperating parts of the index mechanism to provide the following reciprocation of the carriage with the work in indexed relation.

Other objects and features of the invention will become apparent as the description proceeds, especially when taken in conjunction with the accompanying drawings, wherein:

Figure 4 is a plan view of the indexing headstock with parts in section.

Figure 7 is a vertical section through the indexing headstock.

Figure 8 is a fragmentary section through the index carrier.

Figure 9 is an end elevation of a brake and control ring.

2

Figure 10:
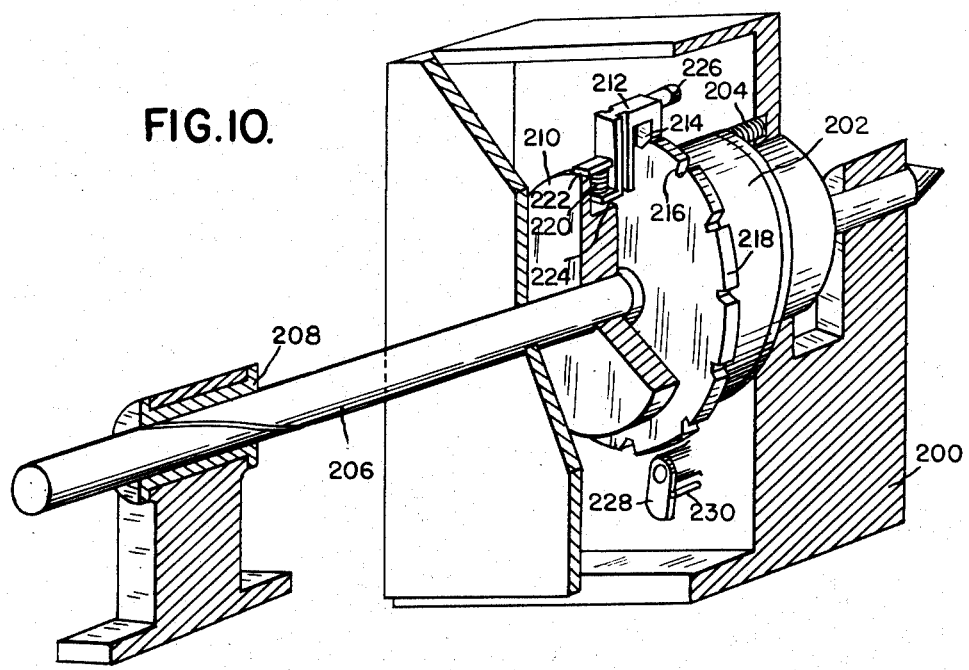
Figure 10 is a diagrammatic perspective view, partly in section, showing a modified construction.
Figure 11:
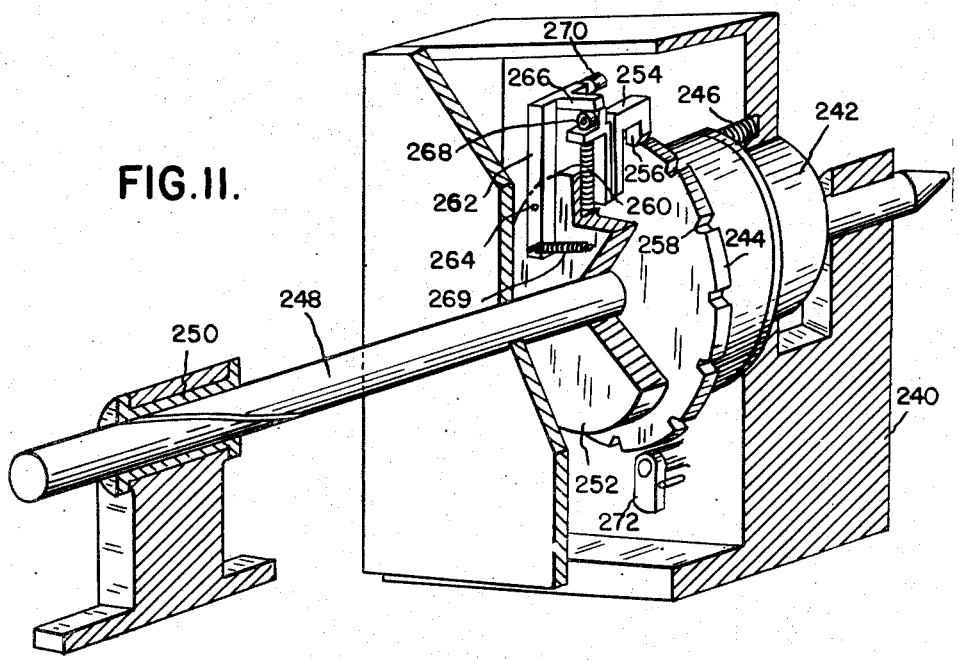

Figure 11 is a view similar to Figure 10 showing yet another modified construction.

Figure 12:
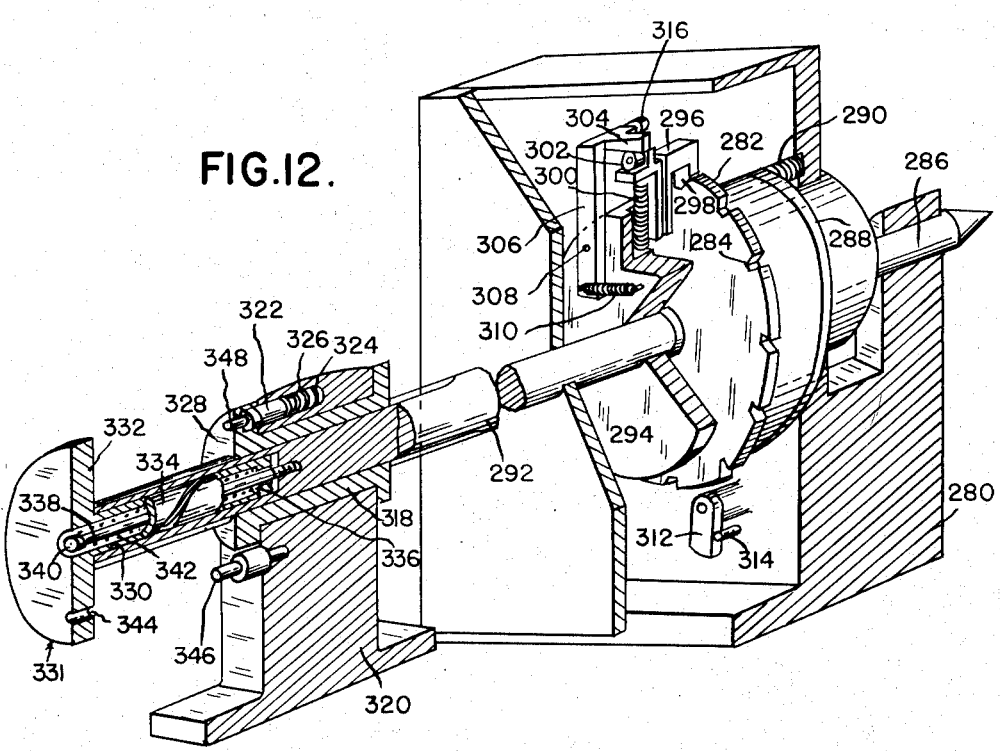

Figure 12 is a view similar to Figure 10 showing yet another modified construction.

Figure 1:
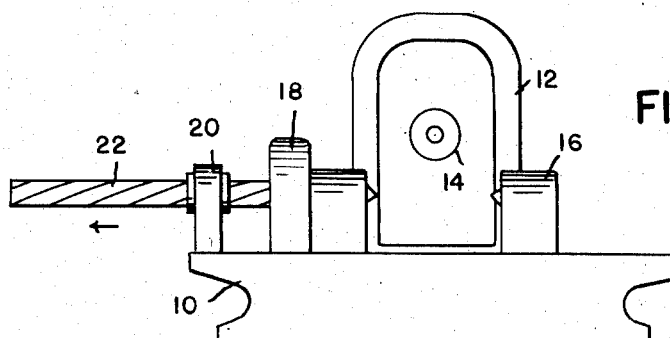
Figure 1 is a front elevation of a grinder of the type to which the present invention is applied.
Figure 2:
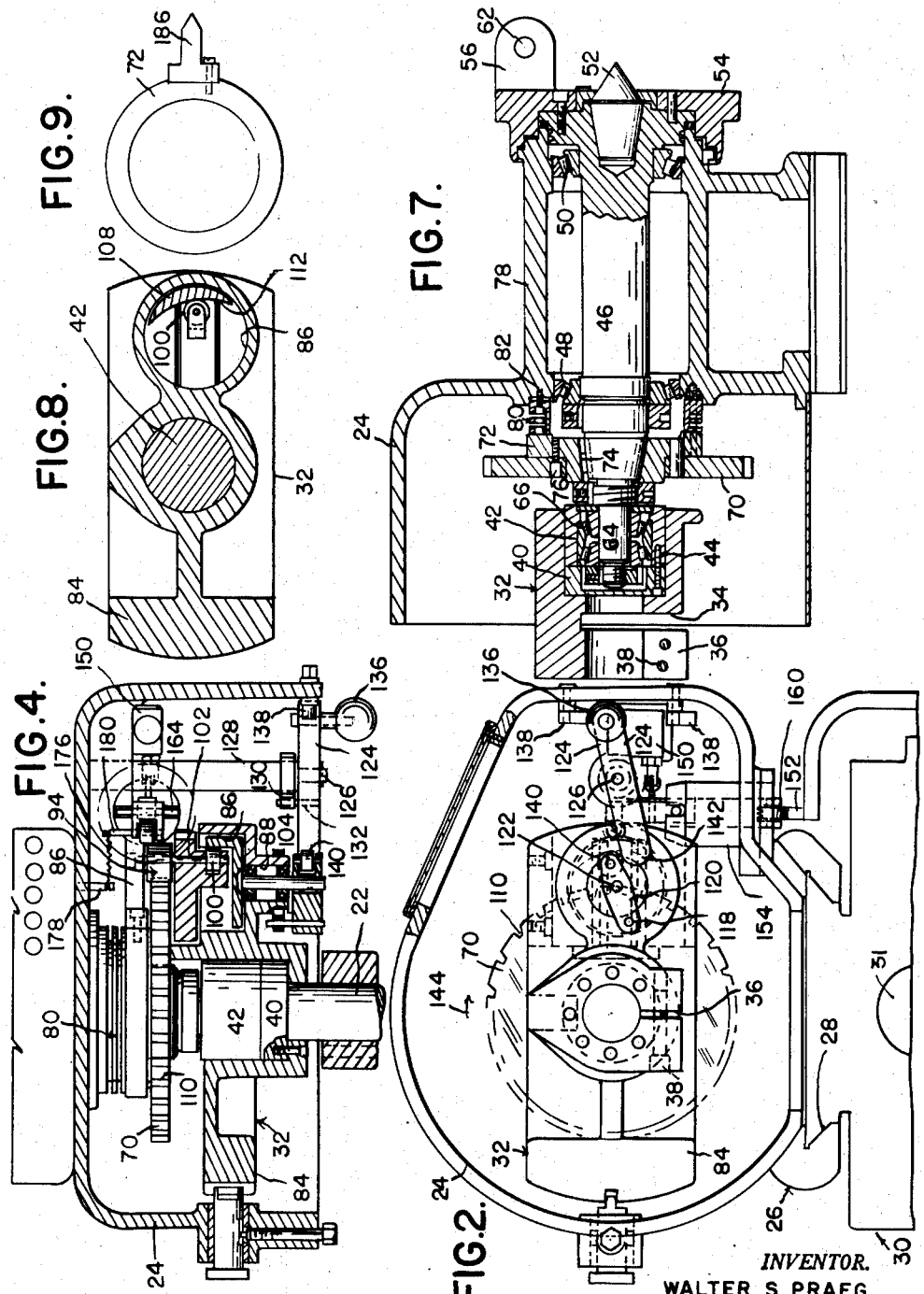
Figure 2 is an enlarged end view partly in section of the indexing headstock as seen from the left in Figure 1, with parts removed to expose the working mechanism.

Referring now to the drawings, in Figure 1 there is illustrated a grinder comprising a base 10 having a tool column 12 extending upwardly at one side thereof adapted to carry the grinding wheel 14, together with suitable mechanism for driving the wheel. The tool support, as is usual, includes means for adjusting the angularity of the wheel as well as its vertical spacing.

The base 10 is provided with the usual carriage which is not shown in this figure, for reciprocation longitudinally on the base (or from left to right as seen in the figure) and on the carriage is provided a tailstock 16 and the indexing headstock 18 which embodies the major features of the present invention. The grinder is completed by a lead nut indicated generally at 20, which cooperates with a lead bar or screw 22 having splines thereon engageable with the splines of the lead nut so as to impart rotation to a work piece mounted between the centers of the headstock and tailstock.

The indexing headstock 18 is best seen in Figures 2–8 and comprises a housing 24 provided at the bottom thereof with a gib construction 26 for cooperation with supporting ways indicated generally at 28 provided on the longitudinally movable carriage 30. Suitable means, such as a hydraulic piston and cylinder device 31, are provided to reciprocate the carriage. The lead bar 22 at the end thereof adjacent the indexing headstock, enters a carrier 32 which is transversely slotted as indicated at 34 and which at its outer end is radially slotted as indicated at 36. Clamping screws 38 are provided by means of which the radially slotted portions of the carrier are clamped to the adjacent end of the lead bar so as to establish a connection therebetween. The carrier 32 is rigidly connected to a cap 40 which in turn is connected to a bearing sleeve 42 by screws such as indicated at 44 in Figure 7.

Figure 6:
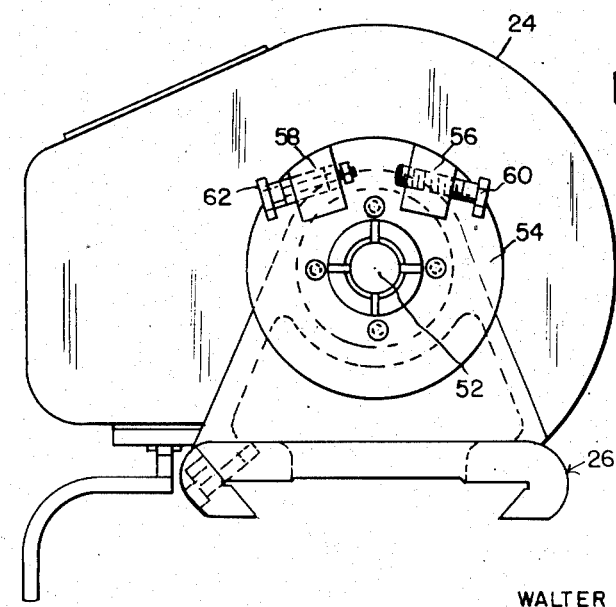
Figure 6 is an end view of the indexing headstock as seen from the right in Figure 1.

Referring now particularly to Figure 7, the indexing headstock includes a center 46 provided with suitable bearings indicated at 48 and 50 and provided at its forward end with a pointed element 52. Also, secured to the front of the center 46 is a plate 54 which as best seen in Figure 6, is provided with spaced ears 56 and 58 provided with clamp screws 60 and 62, to engage a part secured to a work piece so as to impart rotation to the work piece in accordance with rotation imparted to the center 46.

At its outer end the center 46 has a reduced portion 64 mounted in bearings 66, housed within the bearing sleeve 42, which as will be recalled is located in the carrier 32. When the carrier 32 is coupled to the lead bar 22, rotation imparted to the lead bar by the lead nut 20 thus imparts rotation to the center and hence, to the work piece engaged therewith.

To provide for indexing of the work piece on successive strokes, an index plate 70 is provided which is supported on a brake ring 72 keyed or otherwise secured to the center 46 as indicated at 74. The index plate 70 is bolted or otherwise secured to the ring 72, as indicated at 76. The housing 24 is provided with a tubular extension 78 in which the center is located and surrounding the opening into the tubular extension 78 is a friction brake 80 bolted or otherwise secured to the housing 24, as indicated at 82. Inasmuch as this brake is operative to oppose rotation of the ring 72 during operation of the machine, substantial heat develops and accordingly, it is preferred to slot the brake 80 circumferentially as illustrated in Figure 7, to facilitate dissipation of heat.

Figure 3:
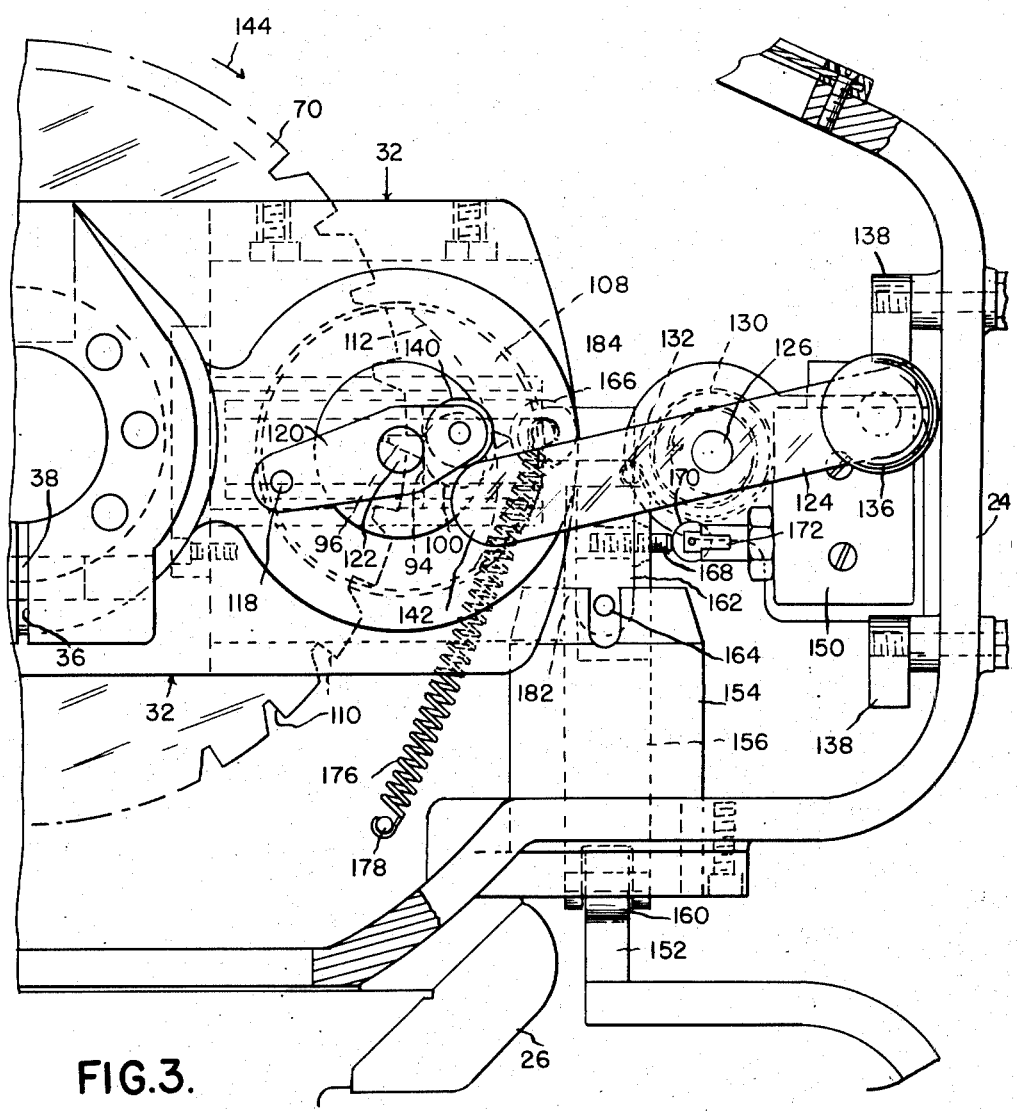
Figure 3 is an enlargement of a portion of Figure 2 showing the operating mechanism in greater detail.

The indexing mechanism is best seen in Figures 2–5 to which reference is now made. As seen in these figures, the carrier 32 is transversely elongated and includes a balancing weight portion 84. Opposite the weighted portion 84 the carrier 32 is provided with a recessed portion 86, the outer wall of which is connected to a tubular sleeve 88. Mounted across the inner end of the recessed portion 86 are ways 90 in which an index plunger or slide, indicated generally at 92, is slidable in a direction radial of the axis of the indexing headstock. A compression spring 93 is provided urging the slide or plunger 92 radially outward. The slide 92, at its inner side is provided with an index element 94 carrying an index finger 96. Preferably, the element 94 is adjustable relative to the slide 92 so as to cooperate with index plates of different effective diameters. The slide 92 at its outer end carries a projection 98 which is recessed to receive a roller 100 mounted on a transversely extending pin 102. Rotatably mounted within the sleeve 88 by bearings indicated at 104, is a camming member 106 which includes a lune shaped cam portion 108, the contour of which is best seen in Figure 8. As best seen in Figure 3, the inner concave surface of the lune shaped cam portion 108 engages the roller 100 and upon rotation of the cam 106 in a direction tending to bring the point of engagement between the cam surface and the roller nearer the center thicker portion of the cam, the slide 92 is moved radially inward with respect to the axis of the headstock forcing the finger 96 to engage in a notch 110 of the index plate 70.

Figure 5:
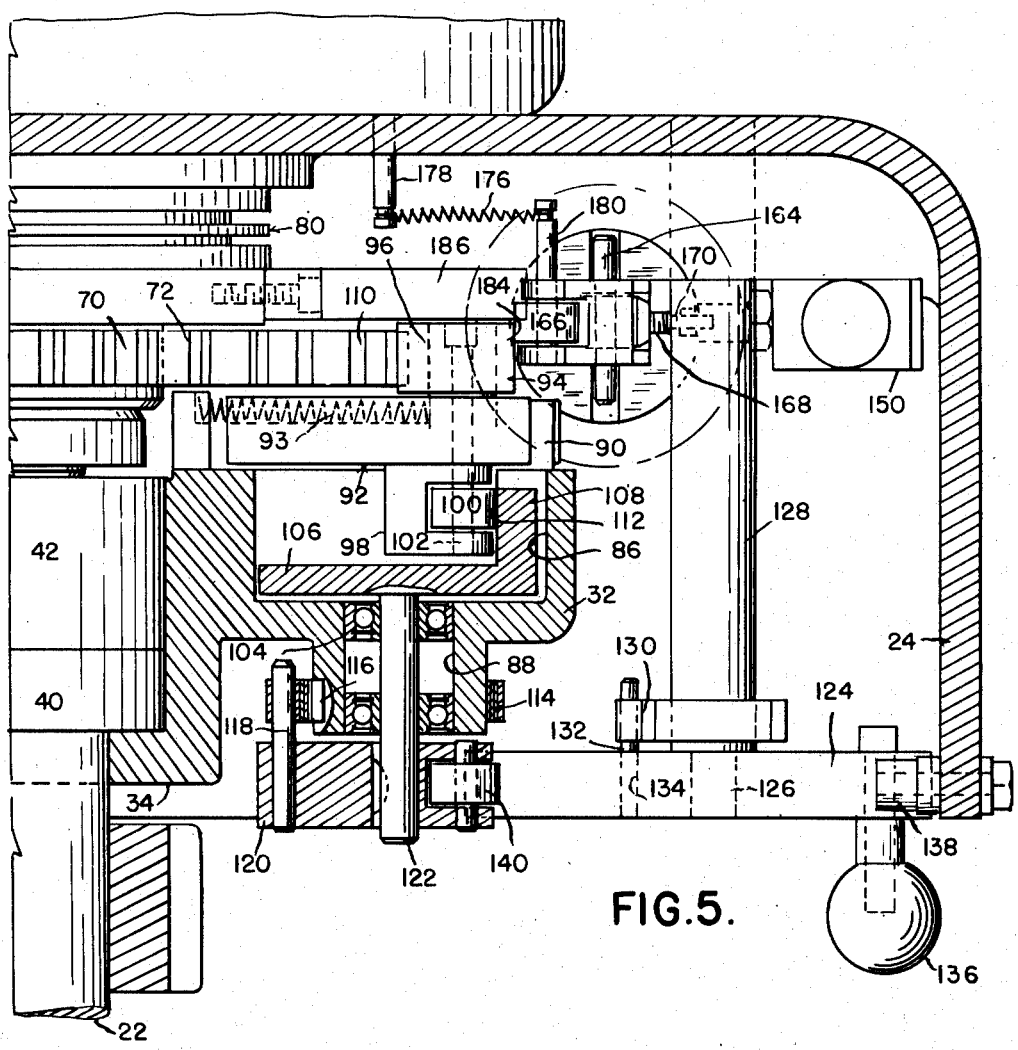
Figure 5 is an enlargement of Figure 4 showing the operating mechanism in greater detail.

The cam member 106 is provided with resilient means for biasing the same in a direction tending to force the roller 100 to the left as seen in Figure 5, thus forcing the finger 96 into a notch 110 of the index plate 70. The camming surface 112 forms a locking angle where it engages the roller 100 and accordingly, the index finger 96 is locked firmly into the index plate 70. The resilient means for accomplishing this purpose comprises a torsion spring 114, one end of which is keyed to the sleeve 88 as indicated at 116, and the other end of which carries a pin 118 connected to a lever 120 keyed to a shaft 122 integral with the camming member 106.

Located at the outer end of the housing 24 is a lever 124, which as seen in Figure 4, is pivoted as indicated at 126 to a transverse support element 128 of the housing 24. The lever 124 is spring biased, a torsion spring 130 being provided for this purpose, one end of the spring being supported on the transverse support element 128, and at its outer end the spring carries a pin 132 received in an opening 134 in the lever 124. At one end the lever 124 is provided with a ball 136 for hand operation. Rotation of the lever 124 in a counterclockwise direction, as seen in Figure 3, is prevented by a rigid abutment 138 located on the interior of the housing 24.

The lever 120 at one end is slotted to receive a roller 140 which is adapted to engage the inner rounded or pointed end 142 of the lever 124 upon rotation of the carrier 32 in clockwise rotation, as seen in Figure 3. With the parts in the relationship illustrated in Figure 3, and assuming rotation of the carrier 32 and index plate 70 is in the direction of the arrow 144, the roller 140 has just contacted the end 142 of the lever 124. At this time counterclockwise rotation of the lever 124 is prevented by abutment 138 and accordingly, further rotation of the carrier results in rotation of the lever 120 in a counterclockwise direction as seen in the figure. This rotation is imparted directly to the camming member 106 and accordingly swings the cam portion 108 relatively counterclockwise about the axis of the shaft 122, thereby releasing the slide 92 for radial outward movement under the influence of the compression spring 93. Outward movement of the slide 92 withdraws the finger 96 from the notch 110 of the index plate 70. The carrier 32, being rigidly coupled to the lead bar, will continue to rotate until completion of the stroke of the machine, but as soon as the index finger 96 is withdrawn from the notch of the index plate, the index plate comes to rest by reason of the friction brake including the rings 72 and 80. Further rotation of the carrier 32 carries the roller 140 past the rounded end 142 of the lever 124. At this time the lever 120, under the influence of the spring 114, rotates clockwise about the axis of the pivot shaft 122, moving the cam to operative position to return the slide 92 and to engage the index finger 96 in the next notch 110 of the index plate. This action may take place very quickly so that the index finger is radially urged by the cam against a surface of the index plate intermediate adjacent notches 110 thereof. However, as soon as the carrier 32 has rotated to a position to bring the index finger 96 into alignment with the next succeeding notch the camming member 106 forces the slide 92 radially inward, thus completing the indexing operation. As the grinder reverses its traverse stroke the roller 140 will engage the underside of the rounded end 142 of the lever 124 (as seen in Figure 3) but this will merely rotate the lever 124 away from the abutment 138.

The foregoing comprises the operating mechanism effective to automatically index the grinder upon successive reciprocations of its carriage. However, as in all automatic machines, safety means are desirable to prevent operation of the machine in case automatic indexing does not take place for any reason. This means comprises a limit switch 150, actuation of which is adapted to interrupt automatic cycling of the machine. Carried by the frame of the machine is a testing cam 152 and the bottom wall of the housing 24 is provided with an opening above which is located a shell guide 154 for supporting a plunger 156. The plunger 156 at its lower end carries a roller 160 adapted to ride up over the cam 152 upon initiation of the first stroke of reciprocation. At its upper end the plunger 156 has pivoted thereto a lever 162, the pivot being illustrated at 164. The upper end of the lever 162 carries a roller 166. The lever 162 also carries an adjustable abutment 168 adapted to cooperate with a roller 170 provided on the plunger 172 of the microswitch 150. A light tension spring 176 is connected at one end to a pin 178 in the housing 24, and at the upper end to a laterally extending portion of a pin 180 which also serves as the pivot mounting for the roller 166. Thus, the lever 162 is biased counterclockwise about its pivot support 164. Such motion is prevented by abutment between the lever 162 and a web portion 182 of the plunger 156. The tension spring 176 also urges the lever 162 and plunger 156 downwardly to insure contact between the roller 160 and the cam 152.

The index element 94 at the side thereof opposite the index finger 96 is provided with a pointed projection 184 which is located adjacent the path of upward movement of the roller 166. If for any reason, the index finger 96 has failed to seat fully within a notch 110 of the index plate 70, the projection 184 lies in the path of upward movement of the roller 166 and will swing the lever 162 clockwise as seen in Figure 3, thereby tripping microswitch 150 and interrupting automatic operation of the machine.

Means are further provided for effecting termination of the automatic cycling of the machine after the work piece has been rotated through 360 degrees. This means comprises an actuating finger 186 bolted or otherwise secured to a part rotatable with the index plate. In practice, the finger 186 is carried by the brake ring 72 as best illustrated in Figure 9. The finger 186 is also adapted when in the proper rotational position to engage the roller 166, this relationship being illustrated in Figure 5. The beginning and end of the automatic cycling takes place with the finger 186 in the position shown in Figure 5, and accordingly the starting circuit is arranged so that while the starting button is depressed the microswitch 150 is ineffective to prevent automatic operation and accordingly, indexing will take place which will move the finger 186 out of the path of the roller 166. After the machine has started the finger 186 is of course indexed around step by step until it again reaches a position to be engaged by the roller 166, which will of course terminate the automatic cycling.

The apparatus is designed so that the indexing headstock may be employed with a lead bar of either hand, requiring reversal of the spring 114, spring 136, and upper and lower abutments 138. It will be appreciated that the lune shape of the cam portion 108 is such that either end of the cam may be employed as just described, the particular end of the cam being employed depending upon the hand of the lead bar.

It will also be apparent that the lead of the lead bar must be sufficient so that in the portion of the stroke used for indexing, sufficient rotation must be imparted to the carrier 32 to move the index finger 96 from one notch to the next of the index plate.

The present arrangement in which a spring biased cam having a very gradual rise is employed, which cams the index plunger to the index plate is particularly desirable since the index finger is thereby locked in place.

However, other arrangements are possible and some modifications of the present invention are illustrated in Figures 10–12. Referring first to Figure 10, which it will be appreciated is largely diagrammatic, an indexing headstock 200 is provided with a brake disc indicated generally at 202 associated with suitable braking mechanism including springs 204. The lead bar 206 is associated with a lead nut 208 and is connected to a carrier 210 carrying an index plunger 212 having an index finger 214 adapted to cooperate with index notches 216 on the index plate 218. In this case a compression spring 220 is provided between a fixed abutment 222 and a finger 224 provided on the index plunger, tending to hold the index finger 214 in the notch 216. The index plunger includes a projection 226 adapted to cooperate with a pivoted camming element 228 in one direction of rotation so as to positively cam the index finger 214 out of the notch to permit indexing substantially as described in the foregoing detailed description of the preferred embodiment of the present invention. Reverse rotation of the carrier 210 causes the projection 226 to move the pivoted element 228 away from a stop pin 230.

Generally, this modification differs from that previously described in that the spring pressure of the spring 220 acts directly to retain the index finger 214 in the notch 216 of the index plate.

Referring now to Figure 11 there is diagrammatically illustrated a modification in which the indexing headstock 240 carries the work center 242 rigidly associated with the index plate 244 and provided with suitable brake means diagrammatically indicated at 246. The lead bar 248 is associated with a lead nut 250 and is connected to a carrier 252 on which is slidably mounted an index plunger 254 having an index finger 256 adapted to enter the index notches 258 on the index plate 244. In this case a compression spring 260 is provided tending to urge the index plunger 254 radially outwardly. Cooperating therewith is a lever 262 pivoted to the carrier 252, as indicated at 264, and including a cam 266 cooperable with a roller 268 carried by the index plunger 254. A tension spring 269 is provided tending to rotate the lever 262 in a direction to force the index plunger 254 radially inwardly. The lever 262 carries a roller 270 adapted to engage a pivoted element 272 and to be actuated thereby upon rotation in a counterclockwise direction, as seen in Figure 11, to release the index finger 256 for outward movement to free the index plate from the index finger. Thereupon, rotation of the index plate is arrested by the brake and continued rotation of the carrier 252 carries the index finger 256 around to registration with the next indexed notch on the index plate. The roller 270 of course rides over the pivoted element 272, thus permitting the spring 269 to swing the lever 262 in such a direction as to cause the cam 266 to apply a force to the index plunger 254 tending to cause the finger 256 to enter the notch 258. As soon as relative rotation between the carrier 252 and index plate 244 brings these parts into registration the index finger 256 enters the notch and due to the locking angle on the cam, is positively locked in place therein for the next succeeding reciprocation of the grinder.

Referring now to Figure 12 there is illustrated another embodiment of the present invention. In all modifications so far described, operation of the mechanism for releasing the index finger and establishing relative rotation between the carrier for the index finger and the index plate is dependent upon rotation of the carrier as a result of the action of the lead bar and accordingly requires a portion of the stroke to be used to accomplish the indexing. In cases where the helix angle of the part, and accordingly the helix angle of the lead bar, is small it may be that the necessary amount of traverse to result in the required relative rotation between the carrier and index plate is excessive. Also, in case the invention is to be employed where the lead bar has straight splines as contrasted to helical, other means must be depended upon for imparting relative rotation to the carrier and index plate.

Of course this result could be accomplished simply by rotating the lead nut at the proper point in the cycle by independent operating means such as a rack and pinion. However, to make the operation fully dependent upon traverse, the mechanism illustrated in Figure 12 may be employed. In this figure the automatic indexing headstock 280 carries the rotatably mounted index plate 282 having index notches 284 therein, permanently coupled to the center 286 which will of course be provided with work rotating members equivalent to the clamping screws 60 and 62 shown in Figure 6. The index plate and center assembly includes a friction brake including a brake ring 288 and friction applying springs indicated diagrammatically at 290. The lead bar 292 has rigidly secured thereto the carrier 294 which includes means for mounting the index plunger 296 to carry the index finger 298 radially of the index plate so as to cooperate with index notches 284. A compression spring 300 is interposed between the carrier 294 and the index plunger 296 and biases the plunger radially outwardly. The index plunger 296 includes a roller 302 which is engaged by a cam 304 carried by a locking lever 306 pivoted as indicated at 308 to the carrier 294. A spring 310 interconnects one end of the lever 306 and the carrier 294 and tends to cause the lever 306 to swing in a counterclockwise direction as seen in Figure 12. Movement of the lever 306 in this direction is effective to cam the index plunger radially inward to effect engagement between the index finger 298 and one of the index notches 284. Mounted within the head is a pivoted element 312 which cooperates with a fixed abutment pin 314 to effect one-way engagement with a roller 316 carried by the lever 306. The arrangement is such that when the carrier rotates counterclockwise as seen in Figure 12, the roller 316 engages the element 312 with the result that the lever 306 swings in a direction to release the index plunger 296 for radial outward movement, thus permitting relative rotation between the carrier 294 and the index plate.

The relative rotation between the carrier 294 and the index plate 282 takes place as a result of mechanism associated with the lead nut 318. In this case the lead nut 318 is provided with straight splines and operates with corresponding straight splines on the lead bar 292 to prevent rotation of the work piece during the grinding stroke. However, as the work table approaches the right hand limit of its stroke (with the parts as illustrated in Figure 12) mechanism becomes operable which effects rotation of the carrier 294 and carries out the indexing cycle. For this purpose the lead nut 318 is rotatably mounted in a support 320 and is normally keyed against rotation therein by a shot bolt 322 provided with a spring 324 normally urging the shot bolt outwardly into a position in which it is partly received within a bore 326 within the nut support and partly received within a radial flange 328 at one end of the lead nut 318. The outer end of the lead bar 292 is recessed as shown at 330, the recess having internal helical splines formed therein. An actuating device 331 having a circular head 332 and having a correspondingly helically splined shaft 334 is carried at the end of the lead bar, the spline shaft 334 being received within the splined recess 330.

The shaft 334 is hollow and is provided with an abutment 336 at its inner end through which extends an elongated headed bolt 338, the end of which is secured to the lead bar. Intermediate the head 340 of the bolt 338 and the abutment 336 is a compression spring 342 normally retaining the actuating device 331 in the position illustrated in Figure 12. The head 332 of the device includes an opening 344 which cooperates with a pin 346 fixedly carried by the support 320. When the head 332 approaches the support 320 the pin 346 enters the opening and locks the actuating device 331 against rotation. At the same time the head 332 engages a plunger 348 which presses the shot bolt 322 inwardly into the support 320 thus permitting rotation of the lead nut 318 in the support 320. Obviously, of course, the plunger 348 is of such length that when its outer end is pressed flush with the surface of the lead nut 318, its inner end is located at the junction between the inner surface of the flange 328 of the lead nut and the cooperating portion of the support. Further motion of the table to the right results in relative motion between the lead bar 292 and the actuating device 331 and this motion, due to the helical splines in the recess 330 in the lead bar, and the shaft 334 results in rotation of the lead bar and hence of the carrier 294. This in turn results in the indexing operation as previously described. In this figure the pivoted element 312 is shown as positioned remote from the lever 306 but this has been merely for clarity and in practice the pivoted element 312 may be in such position that a minimum amount of rotation of the carrier 294 is required to complete the indexing operation.

The drawings and the foregoing specification constitute a description of the improved grinder in such full, clear, concise and exact terms as to enable any person skilled in the art to practice the invention, the scope of which is indicated by the appended claims.

What I claim as my invention is:

1. A grinder comprising a base, a grinding wheel on said base, a table mounted for reciprocation on said base, a lead nut carried by said base, a rotary work support on said table, a lead bar received in said lead nut, and means coupling said lead bar to said work support comprising an index plate having peripheral notches and an index slide having a finger receivable in said notches, means mounting said plate and slide for independent rotation except when said finger is in one of said notches, a brake operable to oppose rotation of said work support, and cam means operable as said slide approaches one end of a stroke of traverse to withdraw said finger from a notch.

2. Structure as defined in claim 1 comprising resilient means urging said finger toward the notched periphery of said plate, said cam means being operable to release said finger upon further approach toward the end of the stroke of traverse.

3. Structure as defined in claim 2 comprising means in addition to said lead nut to provide index rotation of said lead bar upon release of said finger from a notch.

4. Structure as defined in claim 3, said last means comprising means for rotating said lead nut and lead bar simultaneously.

5. Structure as defined in claim 4 in which the means for rotating said lead nut and bar simultaneously comprises a splined member engaging said lead bar, means for arresting traverse and rotation of said splined member as said lead bar approaches one end of its stroke, and means for simultaneously releasing said lead nut for rotation.

6. In a grinder comprising a lead nut, a lead bar, a rotary work support and index mechanism coupling said lead bar to said work support, a cam associated with said index mechanism to release said mechanism for indexing, and a brake associated with said work support to oppose rotation of said work support while said lead bar continues to rotate.

7. Structure as defined in claim 6 in which said cam means includes a part engaged as a result of rotation of said lead bar.

8. A grinder comprising a base, a grinding wheel on said base, a table mounted for reciprocation on said base, a lead nut carried by said base, a rotary work support on said table, a lead bar received in said nut, and means coupling said lead bar to said work support comprising index means including two relatively rotatable parts operatively connected respectively to said lead bar and said work support including members connecting said parts in different positions of angular adjustment, means effective to disconnect said members as said table approaches one end of a stroke and to release said members for reconnection, and brake means effective to arrest rotation of said work support upon disconnection of said members.

9. Structure as defined in claim 8 in which the means for disconnecting said members comprises an actuator on the part connected to said lead bar, and an abutment in the path of rotation of said actuator, said abutment being arranged to operate said actuator upon engagement therebetween in only one direction.

10. A grinder comprising a grinding wheel, a rotary work support, means for effecting relative reciprocation between said wheel and work support in a direction parallel to the axis of said work support, lead control means for controlling the rotational position of said work support during said relative reciprocation, index mechanism intermediate said lead control means and said work support, said index mechanism comprising an index plate having peripheral notches, an index finger receivable in said notches, oppositely acting spring actuated cam means and spring means operated automatically by said relative reciprocation for sequentially withdrawing said finger from a notch and for thereafter moving said finger toward the periphery of said index plate for engagement with a different notch, and brake means for arresting rotation of said work support as soon as said finger is withdrawn from a notch of said plate; said cam means comprising a first cam carried by said work support shaped to press said finger toward said plate, a spring continuously urging said cam in a direction to cam said finger toward said plate, and means comprising an abutment effective sequentially to move said first cam in a direction to release said finger and then to release said cam as said grinder approaches the end of a relative reciprocation, said spring means being operatively connected to said index finger to urge said finger away from said plate.

11. A reciprocable index head for a grinder comprising a rotary work support having an index plate secured thereto, a rotary carrier in said head coaxial with said work support, an index slide on said carrier, means for coupling said carrier to a rotary lead bar, a cam on said carrier operable to urge said slide toward said plate, a spring urging said slide away from said plate, cam actuating means operable upon predetermined rotation of said carrier to move said cam to release said slide for movement away from said plate, said cam including a camming surface at a locking angle with respect to said slide, and resilient means urging said cam in a direction to force said slide toward said plate.

12. A reciprocable index head for a grinder comprising a rotary work support having an index plate secured thereto, a rotary carrier in said head coaxial with said work support, an index slide on said carrier, means for coupling said carrier to a rotary lead bar, a cam on said carrier effective to actuate said slide, cam actuating means comprising an abutment in said head and a member on said carrier engageable with said abutment to actuate said cam to cause said slide to move away from said plate, a switch for terminating automatic operation of the grinder, said switch having an actuating plunger thereon, an index sensitive member movable into position between said slide and said plunger and effective to operate said switch if said slide is not in position corresponding to accurate indexing, and cam means for moving said index sensitive member to said position upon initial movement of said head in a reciprocatory stroke.

13. Structure as defined in claim 12 comprising an actuator on said carrier movable upon 360 degrees index rotation of said carrier into position to engage said index sensitive member to terminate the automatic cycling of the grinder.

14. A grinder comprising a base, a grinding wheel on said base, a table mounted for reciprocation on said base, a lead nut carried by said base, a rotary work support on said table, a lead bar received in said nut, and means coupling said lead bar to said work support comprising an index plate having peripheral notches and an index slide having a finger receivable in said notches, means mounting said plate and slide for independent rotation except when said finger is in one of said notches, a brake operable to oppose rotation of said work support, indexing mechanism comprising oppositely acting spring means and cam means operatively associated with said index slide, said indexing mechanism being constructed and arranged to move said index slide to a position in which said finger is withdrawn from a notch of said index plate and to establish a force tending to move said index slide to a position in which its index finger enters another notch of said index plate during the final part of a stroke of reciprocation of said table in one direction.

15. Apparatus as defined in claim 14 in which said indexing mechanism comprises a spring operatively connected to said index slide urging said slide to a position in which its index finger is out of engagement with notches of said index plate, and said cam means comprises a spring-biased movable cam having a cam surface shaped to urge said index slide toward said index plate and disposed at a locking angle, and abutment means for moving said cam in a direction to release said index slide and then to release said cam for movement by its spring during the final part of a stroke of said table in one direction.

16. Apparatus as defined in claim 15, said cam comprising a member having a pair of oppositely directed symmetrical camming surfaces selectively cooperable with said index slide to provide for use with a right or left hand lead bar and nut.

17. Apparatus as defined in claim 14 in which said indexing mechanism comprises a spring operatively connected to said index slide urging said slide to a position in which its index finger is in engagement with a notch of said index plate, and said cam means comprises a movable cam having a cam surface shaped to move said index slide away from said index plate and abutment means engageable by said cam for sequentially moving said cam to release said finger from a notch of said index plate and releasing said cam to permit return of said index finger toward said index plate during the final part of a stroke of reciprocation of said table in one direction.

WALTER S. PRAEG.

References Cited in the file of this patent

UNITED STATES PATENTS

| Number | Name | Date |
|---|---|---|
| 1,467,985 | Schurr | Sept. 11, 1923 |
| 2,002,967 | Spurr | May 28, 1935 |
| 2,187,062 | Sykes | Jan. 16, 1940 |
| 2,187,544 | Laessker | Jan. 16, 1940 |
| 2,292,588 | Terbrueggen | Aug. 11, 1942 |
| 2,296,731 | Mustonen | Sept. 22, 1942 |

FOREIGN PATENTS

| Number | Country | Date |
|---|---|---|
| 315,508 | Germany | Nov. 6, 1919 |
| 687,619 | Germany | Feb. 2, 1940 |